United States Patent [19]

Siebold

[11] 3,741,234
[45] June 26, 1973

[54] VALVE
[75] Inventor: Howard E. Siebold, Libertyville, Ill.
[73] Assignee: Liquid Controls Corporation, North Chicago, Ill.
[22] Filed: Apr. 26, 1971
[21] Appl. No.: 137,509

[52] U.S. Cl.................. 137/202, 137/451, 251/175, 251/DIG. 2
[51] Int. Cl......................... F16r 31/20, F16k 45/02
[58] Field of Search.................... 137/202, 192, 451, 137/625.28; 251/175, DIG. 2

[56] References Cited
UNITED STATES PATENTS
3,497,179   2/1970   Smyers.............................. 251/175
1,616,875   2/1927   Scheibeler ..................... 137/451 X
571,065   11/1896   Clarke ............................ 137/451 X
601,634   4/1898   Cotter........................ 137/625.28 X Primary Examiner—Alan Cohan
Attorney—Fidler, Patnaude & Batz

[57] ABSTRACT

A valve member for an air eliminator is a flexible band or reed secured at one end to a movable float and at the other end to the housing adjacent a valve seat surrounding a port therein. A flexible sealing band formed of a resilient material overlies and is coextensive with the flexible band to provide a hermetic seal around the valve port when the float moves into a valve closing position. The sealing band is apertured where it overlies the port to equalize the pressure across the sealing band when it is positioned over the port.

4 Claims, 3 Drawing Figures

PATENTED JUN 26 1973

3,741,234

INVENTOR
HOWARD E. SIEBOLD
BY
Fidler, Patnaude & Lago
ATTORNEYS

VALVE

The present invention generally relates to fluid control valves, and it relates more particularly to valves of the type employing a flexible band or reed as the valve element. One such valve is describe in U.S. Pat. No. 3,083,874 issued on Apr. 2, 1963 and assigned to the same assignee as the present invention.

Metallic flexible bands have been used extensively to control the flow of fluids in air eliminators and liquid segregators, and in such applications the flexible bands are generally moved between opened and closed positions by vertically movable floats. The bands are each doubled back on themselves into a generally U-shape and are connected at one end to the float and at the other end to locations on the housing adjacent valve seats with which the flexible bands cooperate.

In order to provide a good seal around the valve port between the flexible band and the valve plate, the valve plates have incorporated a rubber-like coating against which the band seats. Such valve plates are not only expensive but they do not perform well when used with certain types of fluids. One problem is that the coating material expands in the presence of certain fluids which changes the geometry of the valve seat and results in poor sealing. Some unsuccessful attempts to solve this problem have centered on providing a better bond between the coating material and the metal substructure and in laminating a resilient sealing material directly onto the flexible bands.

An object of the present invention, therefore, is to provide a new and improved valve construction.

Another object of this invention is to provide a new and improved flexible reed type valve.

A further object of this invention is to provide new and improved means for effecting a hermetic seal between a flexible reed type valve member and a valve seat.

Briefly, the above and further objects may be realized in accordance with the present invention by providing a resilient sealing member disposed over the face of a valve member for effecting a hermetic seal between the valve member and the associated valve seat. The sealing member is loosely mounted over the face of the valve member and is apertured at the location where it overlies the valve port so as to be removable from the valve seat with the valve member irrespective of the pressure differential across the valve. In a preferred embodiment of this invention the sealing member is an elongated band which is separate from but which overlies the flexible metal band throughout its length, and the two bands are fastened together only at the two locations where the flexible band is secured to the valve actuating member and to the valve housing.

Further objects and advantages and better understanding of the present invention may be had by reference to the following detailed description taken in connection with the accompanying drawing in which.

Figure 1:
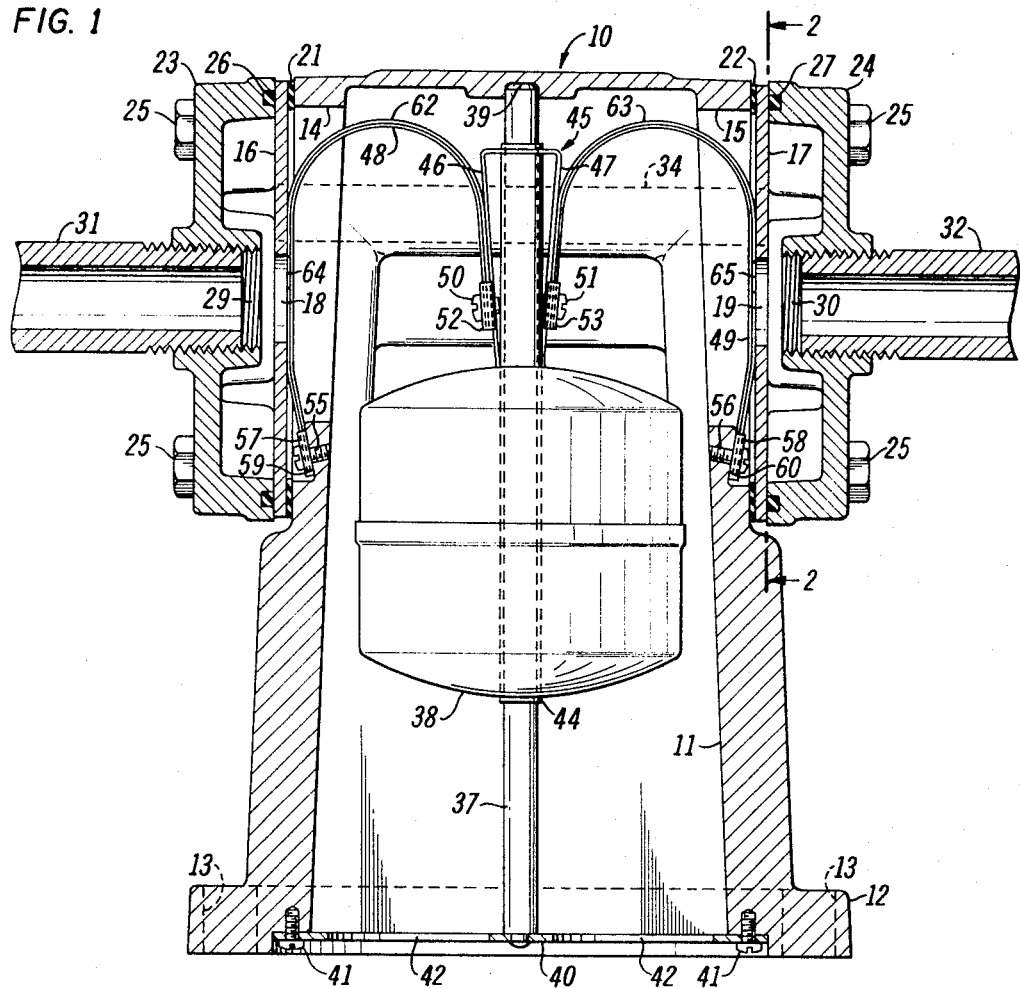
FIG. 1 is a vertically sectioned, elevational view of an air eliminator embodying the present invention.
Figure 2:
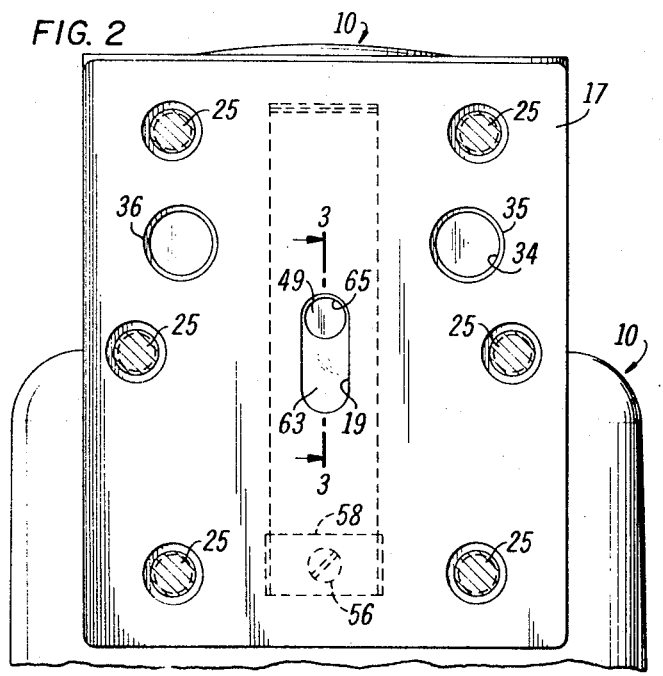
FIG. 2 is an elevational view of one of the valve plates of the device of FIG. 1 taken along the line 2—2 thereof.
Figure 3:
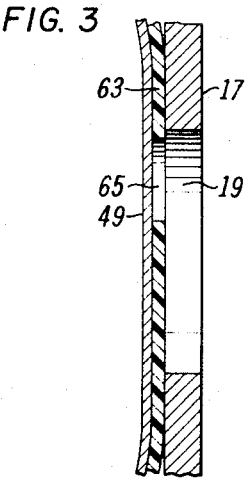
FIG. 3 is a fragmentary sectional view taken along the line 3—3 of FIG. 2.

Referring now to the drawing and particularly to FIG. 1 thereof, a housing member 10 encloses a float chamber 11 which is open at the bottom for communication with a liquid carrying line from which air or other gaseous material is to be removed. A mounting flange 12 suitably apertured as at 13 is provided at the bottom of the housing 10, and a pair of diametrically opposite openings 14 and 15 are provided in the housing 10 adjacent to the top thereof. The openings 14 and 15 are substantially closed by means of a pair of valve plates 16 and 17 which are respectively provided with identically shaped vertically elongated valve ports 18 and 19 therein. The shape of the valve port 19 is best shown in FIG. 2.

A pair of flat generally rectangular gaskets 21 and 22 are respectively positioned between the inner faces of the valve plates 16 and 17 and the adjacent surfaces of the housing 10 surrounding the openings 14 and 15. A pair of end caps 23 and 24 are bolted to the housing 10 over the valve plates 16 and 17 by means of a plurality of bolts 25. Suitable O-ring type gaskets 26 and 27 are mounted in grooves in the faces of the end caps 23 and 24 to provide a hermetic seal between the adjacent surfaces of the valve plates 16 and 17 and the respective end caps 23 and 24. The end caps 23 and 24 are respectively provided with tapped centrally disposed bores 29 and 30 and receive a pair of pipes 31 and 32. Pressure equalizing passageways 34, only one of which is shown in FIG. 1, are provided in the housing 10 and are aligned with openings 35 and 36 in the valve plates 16 and 17 for interconnecting the generally annular chambers in the end caps 23 and 24.

A float guide stem 37 is centrally mounted within the float chamber 11 and a hollow float 38 is slidably mounted on the stem 37. More particularly, the upper end of the stem 37 is located in a generally cylindrical recess 39 provided in the inner face of the top wall of the housing 10 and the bottom end of the stem 37 is riveted to a circular mounting plate 40 fastened to the housing 10 over the bottom of the chamber 11 by means of a plurality of machine screws 41. A plurality of large openings 42 are provided in the plate 40 to permit the free flow of fluid into and out of the float chamber 11.

The float 38 is part of an integral assembly which includes a tube 44 slidably disposed on the stem 37 for movement with the float 38. A generally U-shaped mounting bracket 45 is fixed to the tube 44 above the float 38 by any suitably means such, for example, as by welding the bottom end portions of the legs 46 and 47 of the bracket 45 to the tube 44.

With the float assembly in an upper position as shown in FIG. 1, the valve ports 18 and 19 are adapted to be closed by a pair of imperforate reed type valve members 48 and 49 which are each secured to the bracket 45 at one end and to the housing 10 at the other end. As shown, the inner ends of the reeds or bands 48 and 49 are respectively secured to the legs 46 and 47 of the bracket 45 by means of a pair of screws 50 and 51 which extend through a pair of apertured mounting plates 52 and 53 and aligned apertures cut in the reeds 48 and 49. The screws 50 and 51 are threaded into openings in the legs 46 and 47, thus securing the reeds to the float. The outer ends of the reed members 48 and 49 are respectively secured to the housing 10 by a pair of screws 55 and 56 which extend through apertured mounting plate 57 and 58 and aligned apertures in the reeds 48 and 49 and threaded into suitable bores in the housing such that the lower ends of the reed members 48 and 49 lie against upwardly diverging mounting faces 59 and 60 respectively. It may thus be seen that the reed members 48 and 49 extend upwardly from their points of securement to the bracket 45 and are doubled over into a U-shape to extend downwardly past the corresponding valve ports 18 and 19 to their points of securement directly below the valve ports. Preferably the surfaces 59 and 60 are sloped, as shown, to bias the valve members 48 and 49 against the surfaces of the valve plates 16 and 17 surrounding the valve ports 18 and 19. The legs 46 and 47 of the bracket 45 diverge inwardly, as shown, so that the reed members 48 and 49 exert a small upward force on the float 38. In some applications it is preferable for the legs 46 and 47 to be parallel so that the valve members 48 and 49 exert substantially zero force on the float 38.

It may thus be seen that when the float 38 and the associated assembly are in the raised position as illustrated in FIG. 1, the reed members 48 and 49 will cover and close the valve ports 18 and 19. As the float moves downwardly from the position shown, the reeds are gradually peeled away from the valve plates 16 and 17 to open the ports 18 and 19 from the top down.

In order to provide a hermetic seal between the reeds 48 and 49 and the valve plates 16 and 17 it was common practice in the prior art to coat the inner faces of the valve plates 16 and 17 with a resilient material such as plastic or rubber. However, because of seepage of fluid between the resilient layer and the metal substrate or because of other reasons such as expansion of the sealing material in the presence of certain fluids, such valve seats often times became distorted, resulting in leakage past the reeds 48 and 49.

In accordance with the present invention a pair of sealing strips 62 and 63 are formed of a resilient sealing material such as plastic or rubber and have a shape substantially identical to that of the reeds 48 and 49. While the sealing strips or bands 62 and 63 are separate from and are not bonded to the reeds 48 and 49, they are secured to the reeds at the same locations where the reeds are secured to the bracket 45 and housing 10. More particularly, the sealing bands 62 and 63 are apertured near their inner ends to receive the shanks of the screws 50 and 51 and are apertured near their outer ends to receive the shanks of the screws 55 and 56. The sealing bands 62 and 63 are relatively soft and flexible compared to the metal reeds 48 and 49 and in accordance with the present invention are provided with apertures 64 and 65 which lie directly opposite to the upper portions of the ports 18 and 19 when the valve is in a closed position. The openings 64 and 65 are necessary to equalize the pressure across the sealing bands 62 and 63 so that when the float 38 moves downwardly from the illustrated closed position to peel the reeds 48 and 49 away from the valve plates 16 and 17, the sealing bands 62 and 63 will follow. Without the openings 64 and 65, a pressure differential may build up across the sealing bands 62 and 63 to hold them in engagement with the valve plates 16 and 17 as the float moves down, and in some cases to actually force the sealing bands into the valve ports thereby rendering the device inoperative.

The device of FIG. 1 is an air eliminator and, therefore, as the amount of air collected in the float chamber 11 increases, the liquid level in the chamber will decrease whereby the float drops to open the ports 18 and 19 and permit the air to escape. The device of FIG. 1 can also be used as a liquid segregator wherein the less dense liquid is collected in the upper portion of the float chamber 11 and is removed through the pipes 31 and 32 as the float 38 sinks in the chamber 11. This same device can also be used to remove heavier or more dense liquids from a system by mounting the device illustrated in FIG. 1 in an inverted position whereby when the heavier liquid is collected in the bottom of the chamber (top as shown in FIG. 1) the float rises thereby to permit the heavier liquid to escape through the pipes 31 and 32.

The reeds 48 and 49 are preferably formed of a strong spring type metal such, for example, as Elgiloy and the sealing bands 62 and 63 are preferably formed of a plastic sealing material such, for example, as Teflon or of natural rubber. These sealing bands need not be particularly strong since there is no pressure differential developed across them and their sole purpose is to provide a hermetic seal between the reeds 48 and 49 and the valve seat surfaces provided on the valve plates 16 and 17.

Referring to FIG. 2, it may be seen that the opening 65 in the sealing band 63 is positioned so as to be located adjacent to the upper end of the valve port 19. The opening 64 in the sealing band 62 is similarly located so that as the reeds 48 and 49 begin to peel away from the valve ports 18 and 19 any pressure differential built up across the sealing bands 62 and 63 is immediately relieved while the sealing bands are still held in place by the reeds 48 and 49 against a large surface area of the valve plates 16 and 17 immediately adjacent to the ports 18 and 19.

The present invention thus eliminates the need and expense of laminating a resilient layer or coating on the valve plates 16 and 17. Moreover, the sealing bands 62 and 63 need not be laminated or otherwise sealed to the reeds 48 and 49 thus assuring a long and effective life without any change in configuration of the sealing member.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention

What is claimed is:

1. An air eliminator of the type comprising a housing defining a float chamber therein, a float disposed in said chamber, a plurality of reeds connected between said float and said housing for controlled movement over vertically elongated valve ports in said housing as said float moves upwardly in said chamber, the improvement comprising a plurality of resilient, flexible sealing strips secured to said reeds at spaced apart locations to be positioned between said reeds and valve seats surrounding said valve ports,
 said sealing strips being provided with apertures which are aligned with the upper portions of said valve ports when said reeds are positioned over said valve ports.

2. A valve having a valve seat and a valve member movable toward and away from said seat to open and close an aperture in said valve seat, the improvement comprising a soft, flexible, sealing member mounted on said valve member for movement by said valve member against said seat over said aperture, said sealing member being provided with an opening therethrough, said opening being aligned with said aperture to equalize the pressure across said sealing member, said valve member being an elongated flexible reed having one end fixed relative to said seat and the other end movable, thereby to move an intermediate portion of said reed relative to said seat.

3. A valve according to claim 2 wherein said sealing member is a strip attached near both of its ends to said reed.

4. An air eliminator embodying a pair of valves as set forth in claim 3, and further comprising a housing defining a float chamber in which said valves are mounted, a float disposed in said chamber, means connecting said other end of each of the reeds in said valves to said float, and means connecting said one end of each of the reeds in said valves to said housing.

* * * * *